US010023394B2

(12) United States Patent
Betancourt et al.

(10) Patent No.: US 10,023,394 B2
(45) Date of Patent: Jul. 17, 2018

(54) PRESSURE ROLLER BEARING FOR A PALLET CAR

(71) Applicant: Cast Steel Products LP, By Its General Partner Cast Steel Products GP Ltd., Edmonton (CA)

(72) Inventors: Daniel Betancourt, Tampa, FL (US); Cristobal J. Gonzalez, Sefner, FL (US)

(73) Assignee: Cast Steel Products LP, By Its General Partner Cast Steel Products GP Ltd., Edmonton, Alberta (CA)

( * ) Notice: Subject to any disclaimer, the term of this patent is extended or adjusted under 35 U.S.C. 154(b) by 112 days.

(21) Appl. No.: 14/903,641

(22) PCT Filed: Jun. 25, 2015

(86) PCT No.: PCT/CA2015/050594
§ 371 (c)(1),
(2) Date: Jan. 8, 2016

(87) PCT Pub. No.: WO2016/205916
PCT Pub. Date: Dec. 29, 2016

(65) Prior Publication Data
US 2017/0253436 A1    Sep. 7, 2017

(51) Int. Cl.
*F16C 33/76*    (2006.01)
*F16C 33/80*    (2006.01)
(Continued)

(52) U.S. Cl.
CPC ............. *B65G 39/09* (2013.01); *B65G 35/08* (2013.01); *F16C 19/46* (2013.01); *F16C 19/48* (2013.01);
(Continued)

(58) Field of Classification Search
CPC .......... B65G 39/09; F16C 19/46; F16C 19/48; F16C 33/585; F16C 33/586;
(Continued)

(56) References Cited

U.S. PATENT DOCUMENTS 2,274,137 A * 2/1942 Frauenthal .............. F16C 19/46
277/562
2,355,818 A * 8/1944 Potter ..................... F16C 19/46
384/561
(Continued)

FOREIGN PATENT DOCUMENTS

| CN | 101769313 A | 7/2010 | |
|---|---|---|---|
| DE | 2138492 A1 * | 2/1973 | ............... D01H 5/56 |
| GB | 562475 A | 7/1944 | |

OTHER PUBLICATIONS

Outotec Oyj, Outotec Pallet Cars for Sintering and Pelletizing, 2012, pp. 1-4.
(Continued)

*Primary Examiner* — Phillip A Johnson
(74) *Attorney, Agent, or Firm* — Boyle Fredrickson, S.C.

(57) ABSTRACT

The present invention relates to a pressure roller bearing for a pallet car of a pelletizing machine. The bearing includes an external annular race having: an exterior surface for reversible mating engagement with a tooth gap of a wheel, a pair of sidewalls defining ends of the bearing, wherein the radial diameter of the exterior surface at a center portion in the axial direction is greater than the radial diameter of the exterior surface at the ends of the bearing, and an interior annular groove; an internal annular race defining a hole therethrough for receiving an axle, and having an exterior annular groove; and a plurality of rolling cylindrical members located in an interior space defined by the interior
(Continued)

annular groove and the exterior annular groove when the internal annular race is received by the external annular race.

16 Claims, 15 Drawing Sheets

(51) Int. Cl.
| | |
|---|---|
| *B65G 39/09* | (2006.01) |
| *F16C 33/78* | (2006.01) |
| *F16C 33/58* | (2006.01) |
| *F16C 19/46* | (2006.01) |
| *F16C 19/48* | (2006.01) |
| *B65G 35/08* | (2006.01) |

(52) U.S. Cl.
CPC ........ *F16C 33/586* (2013.01); *F16C 33/7823* (2013.01); *F16C 33/80* (2013.01); *F16C 2240/40* (2013.01); *F16C 2240/70* (2013.01); *F16C 2326/58* (2013.01)

(58) Field of Classification Search
CPC .............. F16C 33/7823; F16C 33/7853; F16C 33/7876; F16C 2326/58
See application file for complete search history.

(56) References Cited

U.S. PATENT DOCUMENTS

| | | | |
|---|---|---|---|
| 2,838,349 A * | 6/1958 | Maas | F16C 19/46 |
| | | | 16/18 CG |
| 3,642,335 A | 2/1972 | Takahashi et al. | |
| 3,752,543 A * | 8/1973 | Schmidt | F16C 13/006 |
| | | | 277/369 |
| 5,080,502 A | 1/1992 | Diedrich | |
| 2006/0153484 A1 | 7/2006 | Ohata et al. | |
| 2014/0021016 A1 | 1/2014 | Schulakow-Klass et al. | |

OTHER PUBLICATIONS

HCT Bearings, Pressure Roller Bearing, PRB Series (For Pallet Cars in Sinter Plant), pp. 250-253.
Ecplaza Network Inc., Pressure Roller Bearing for Sinter Pallet Car 1996, pp. 1-2.
KITA (Korea International Trade Association), HKT Bearings, Ltd., Pressure Roller Beating PRB Series (For Pallet Cars in Sinter Plant), 2008-2015, pp. 1-5.
NSK, Sealed-Clean Bearings for Sintering Pallet, p. 1.

* cited by examiner

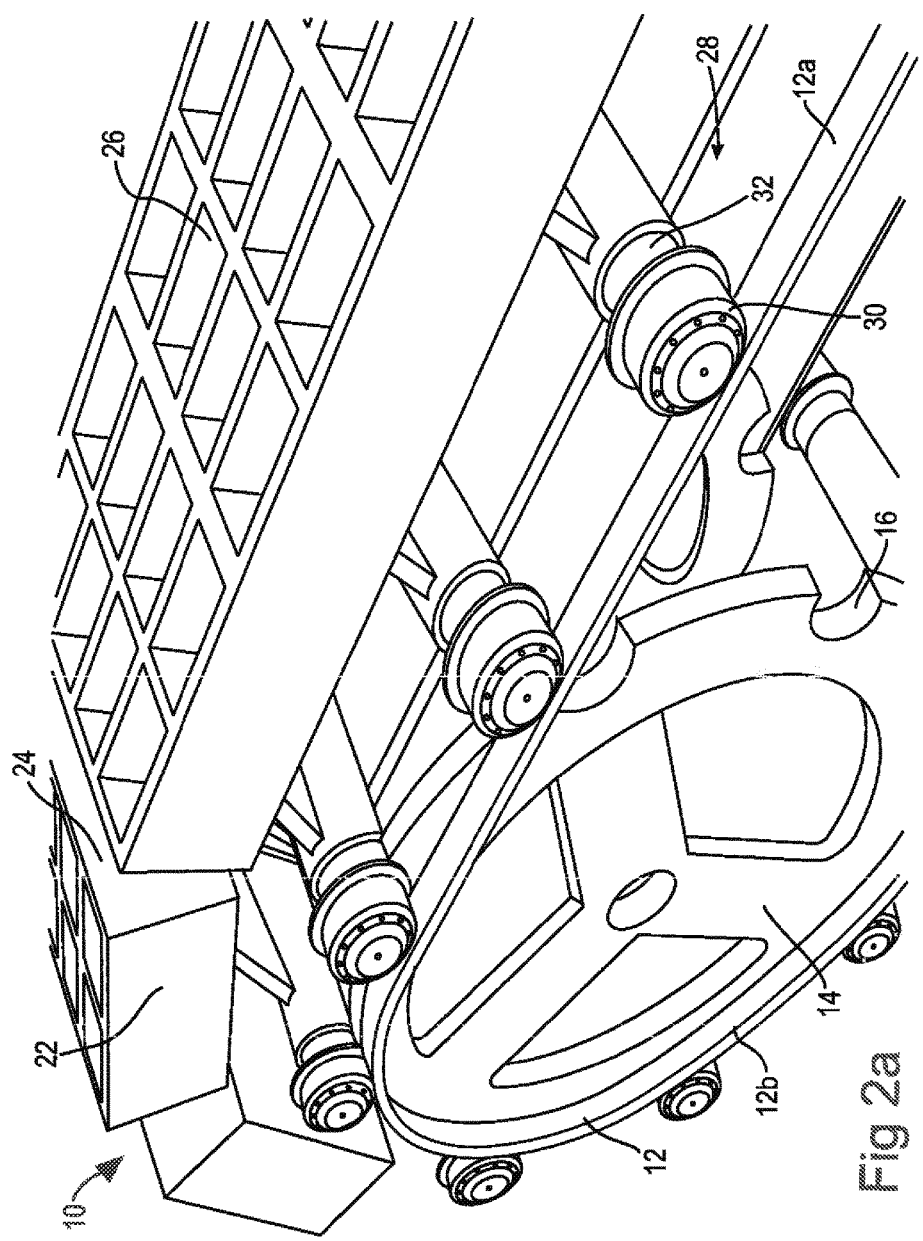

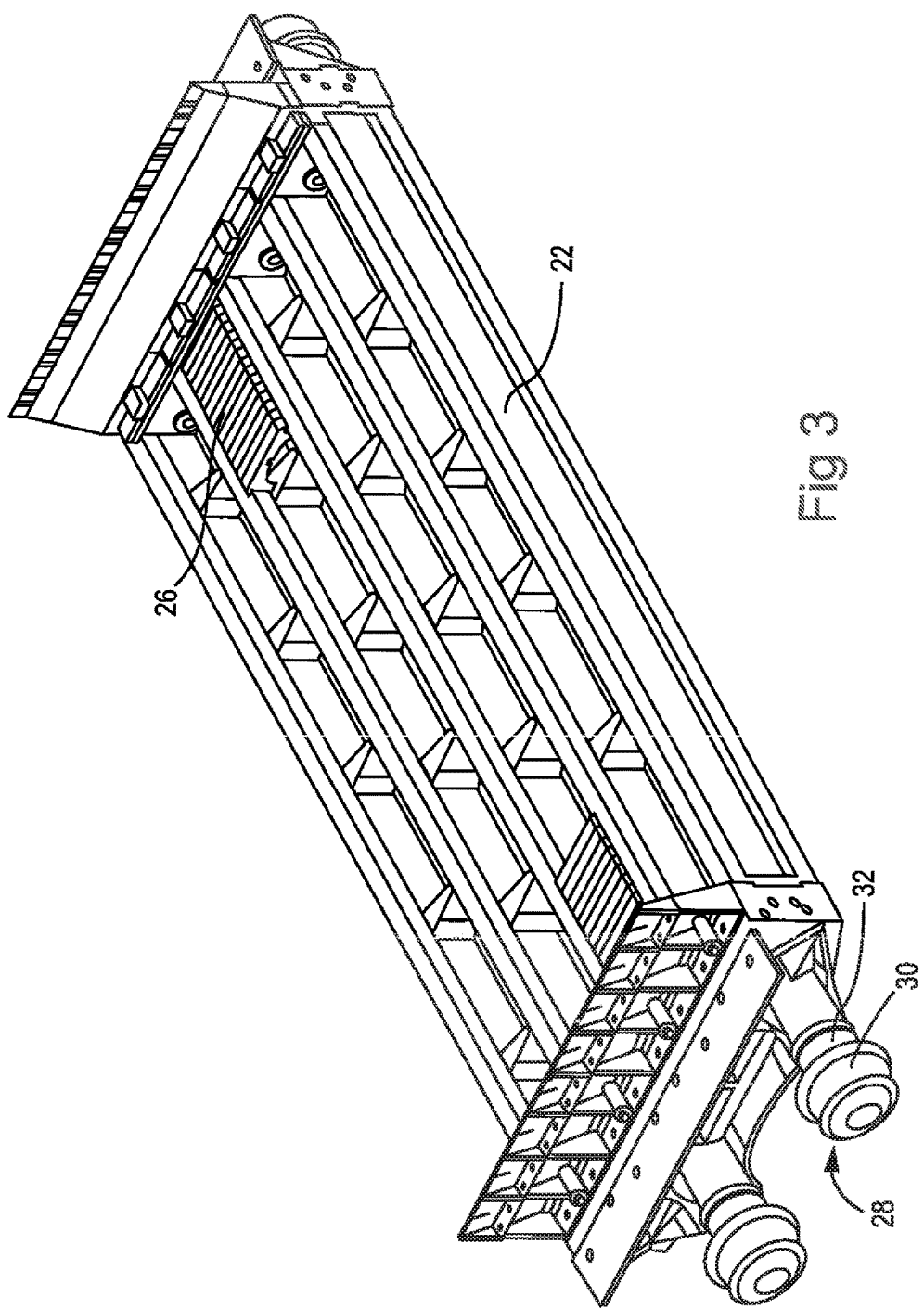

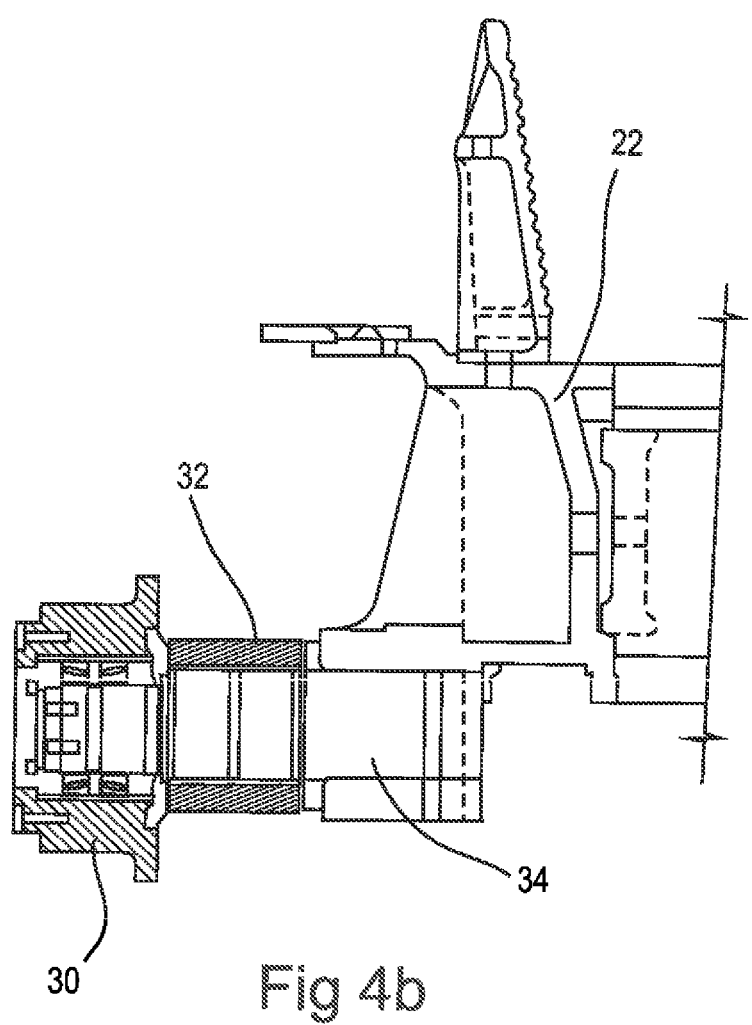

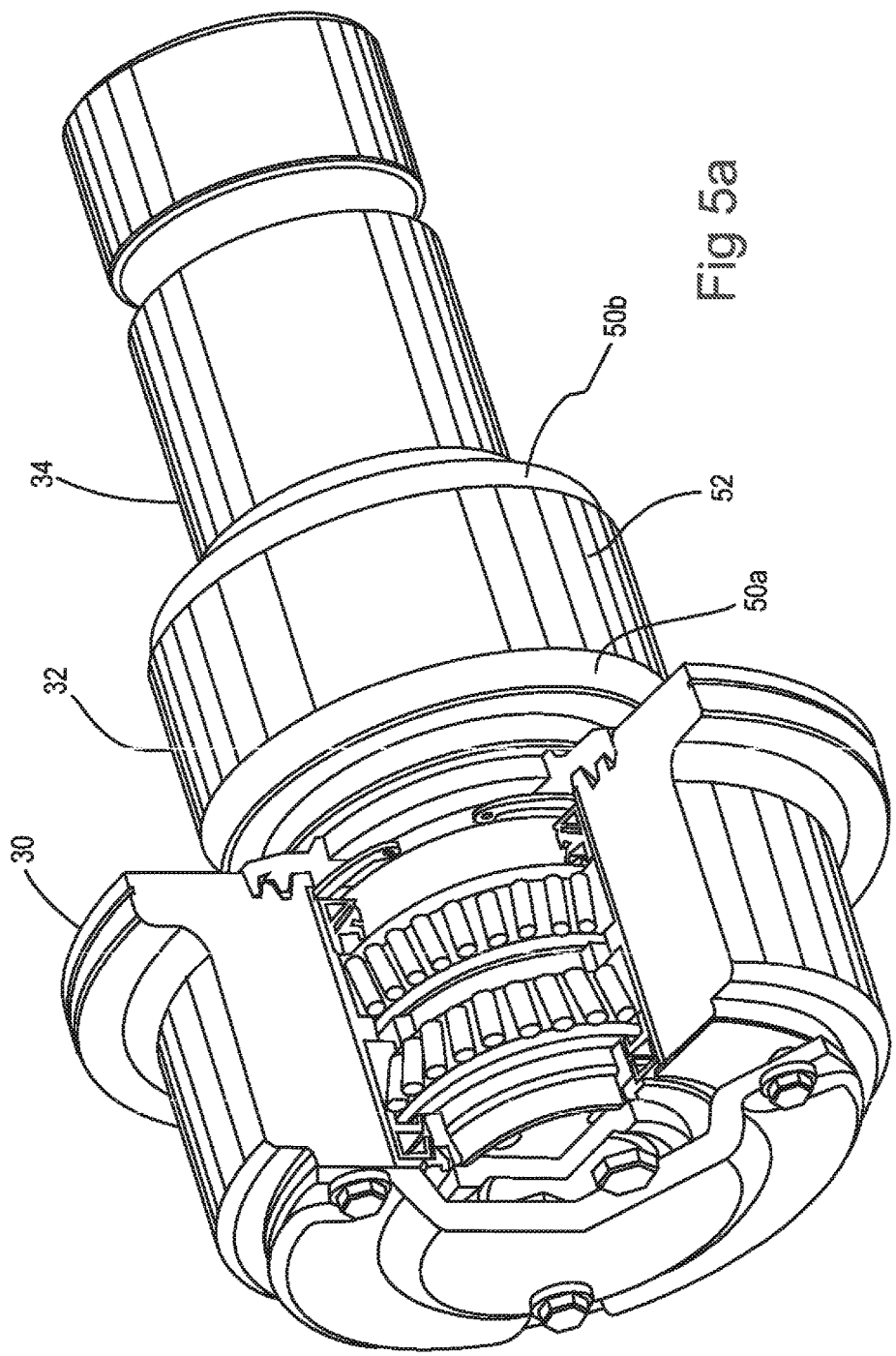

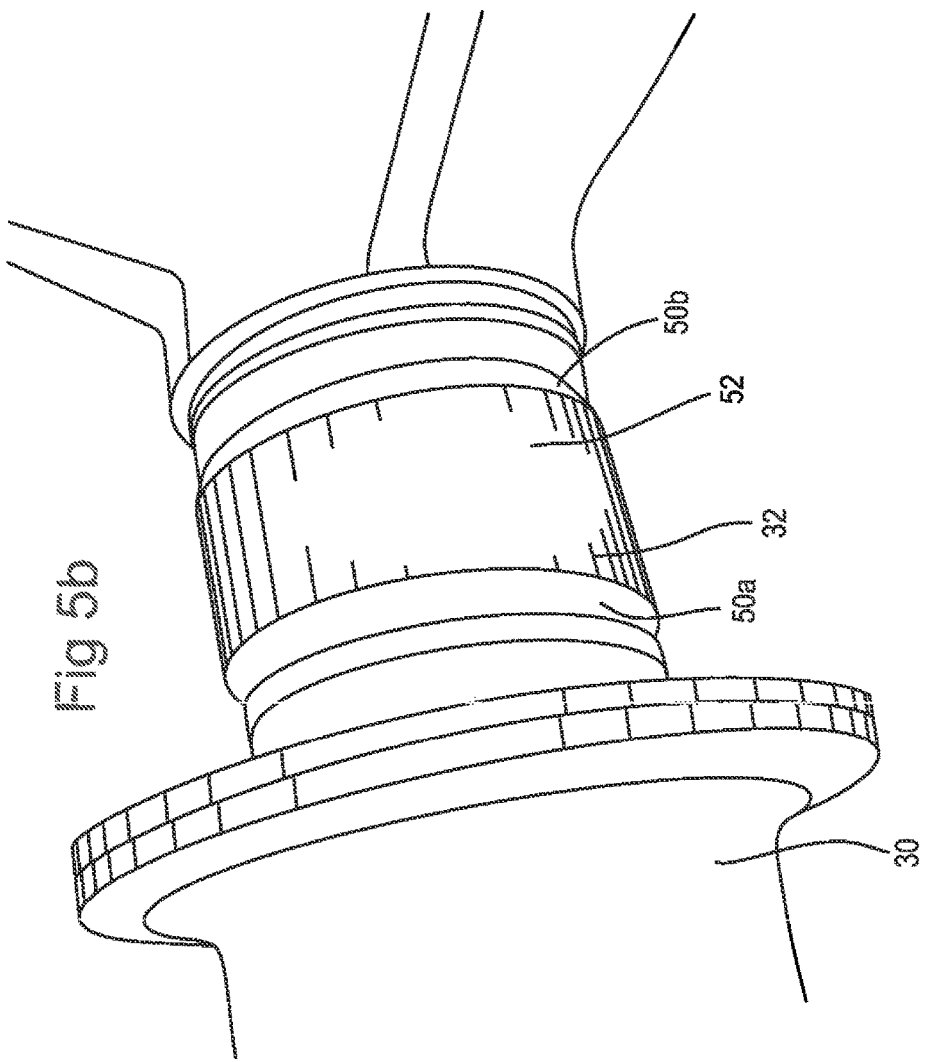

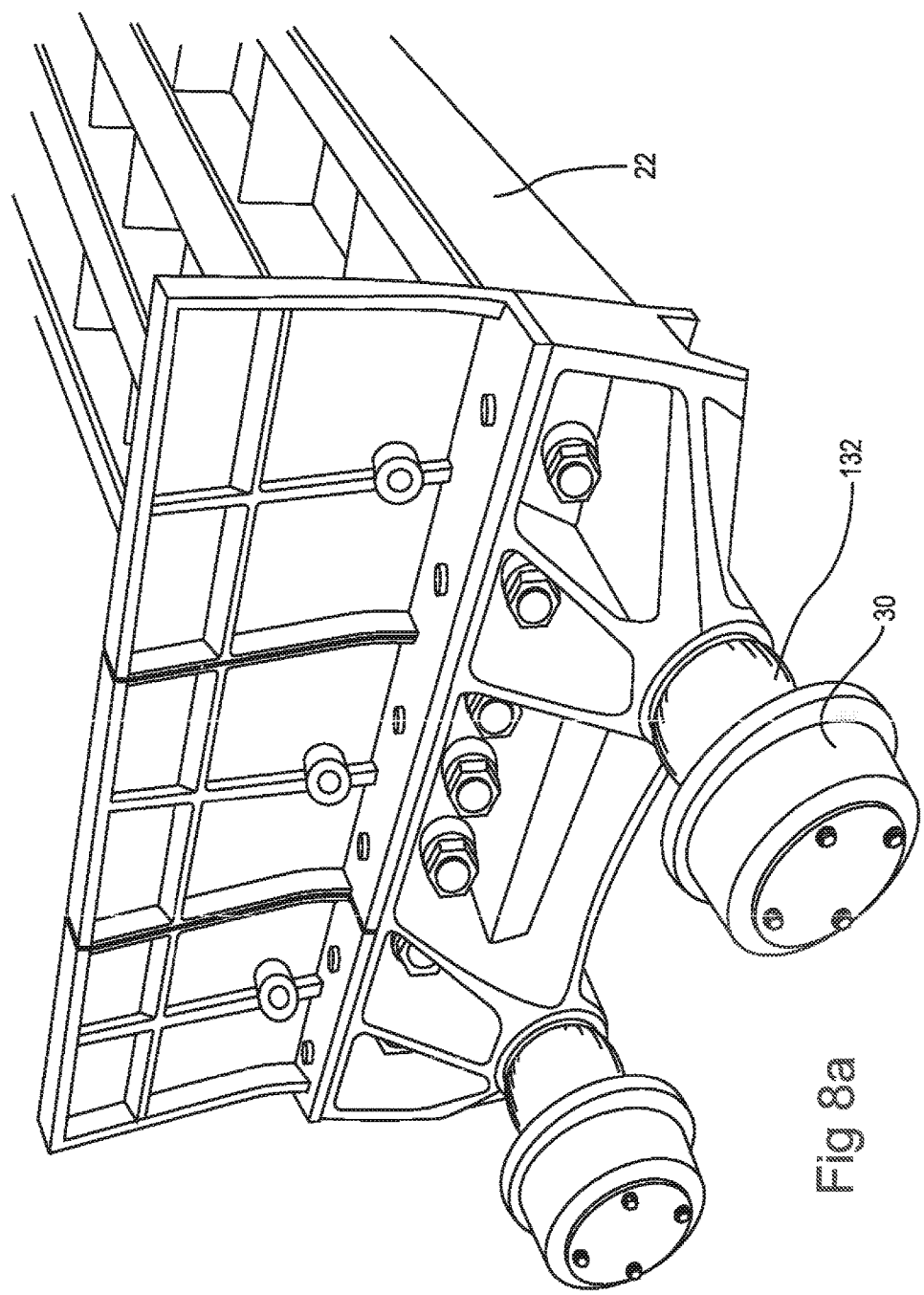

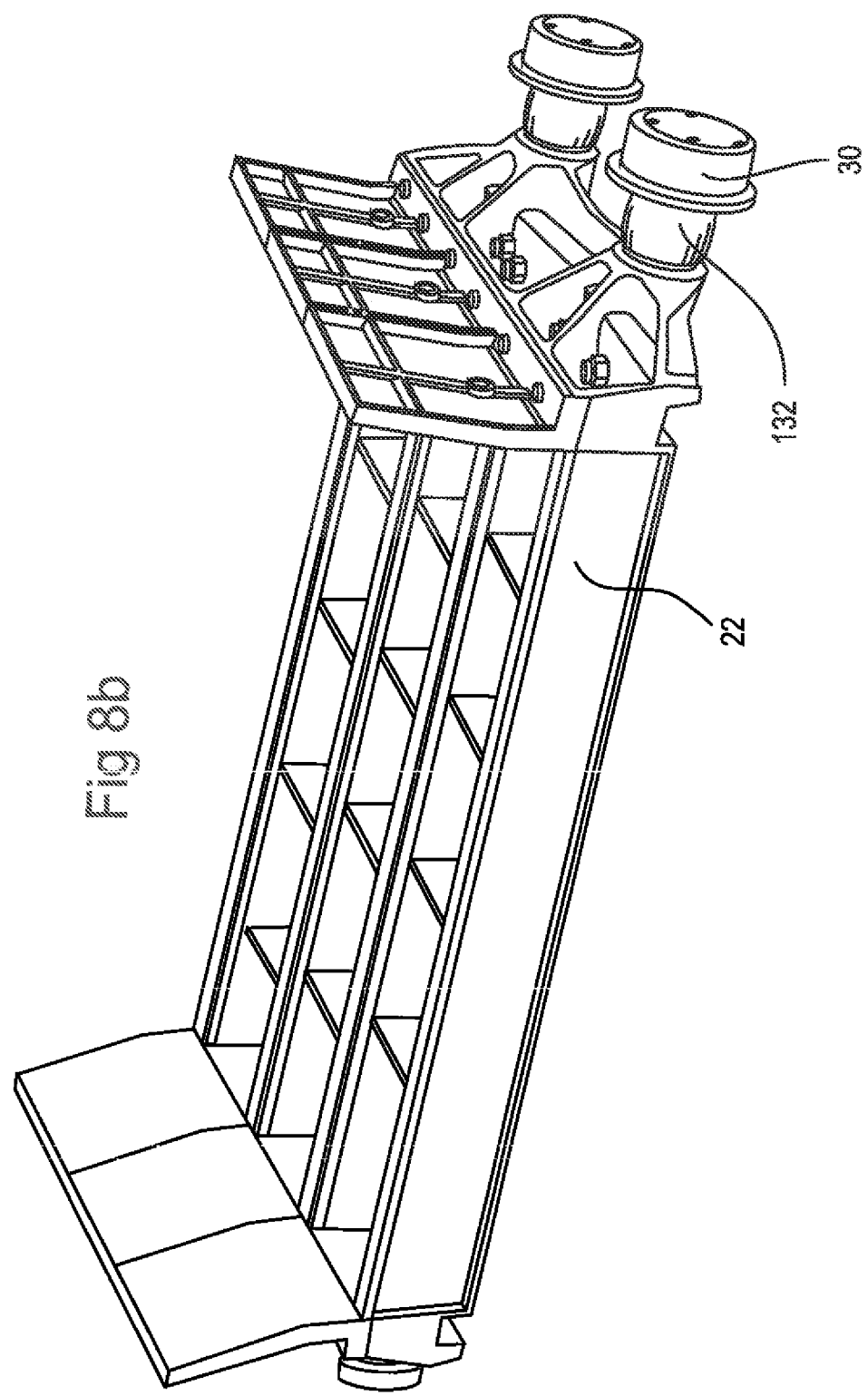

PRESSURE ROLLER BEARING FOR A PALLET CAR

TECHNICAL FIELD

The present invention relates to a pressure roller bearing for a pallet car.

BACKGROUND

When pelletizing or sintering plants the bulk material to be treated, for example iron ore or zinc ore, is loaded onto a pallet car where a plurality of cars forms an endless chain, also referred to as traveling grate. The pallet cars are filled with the bulk material and pass through various treatment stations, in which a thermal treatment of the material, such as drying, firing and cooling, is effected. By a drive or lifting wheel, the pallet car chain is moved through the treatment stations along a top strand of a guide rail by a means described below. Pallet cars include a track assembly comprising a set of track rollers that rotatably support the pallet cars and are configured to be guided in the rails and a set of pressure roller bearings which are adjacent to the track rollers. At the end of the top strand, the heat-treated material is dumped by gravity at a lowering wheel or tipping wheel (discharge station), whereupon the empty pallet cars are returned upside down along a bottom strand to the lifting wheel. Tooth gaps of the drive or lifting wheels engage pressure roller bearings which are arranged on the axle and adjacent to the track rollers which serve to lift the pallet cars from the bottom strand to the top strand and return the pallet cars to an upright position. Accordingly, the pallet car chain is moved in the top strand and the bottom strand by the pushing and pulling action of the drive and driven wheels on the pressure roller bearings.

Roller bearings, which are a type of bearing, carry a load by placing rolling members (such as balls or rollers) between two bearing rings called races. Roller bearings are known to be used in many types of industries for power transmission, in gear pumps, and in machine tools. Pressure roller bearings are a type of roller bearings and distinct from typical roller bearings, pressure roller bearings are designed with additional considerations in mind. Pressure roller bearings have to support the heavy loads carried by the pallet cars. Pressure roller bearings are also subjected to severe and constant mechanical stresses when they continuously engage and disengage from the tooth gaps of the lifting and lowering wheels during use. Accordingly, pressure roller bearings are generally robustly built and designed to withstand significant mechanical stresses. However, current designs of pressure roller bearings, which are substantially cylindrical, have been found to be fairly susceptible to breakage.

Consequently, pallet cars must be exchanged after a certain period of use, and during the repair of the pressure roller bearings, the sintering process may be slowed or even halted. To minimize the disruption of the sintering plant, some systems are known for efficiently replacing damaged pallet cars to effect repairs to, among other things, the pressure roller bearings. US patent application 2014/0021016 to Schulakow-Klass discloses a device for changing a damaged pallet car. Using the system of the Schulakow-Klass, an individual damaged pallet car can more easily be separated from the travelling grate for effecting the necessary repairs. Nonetheless, during the repair process, the particular pallet car itself is still not usable.

Accordingly, there is a need for a pressure roller bearing that is more durable and less susceptible to breakage.

Downtime of the sintering plant is unavoidable and costly when the drive or driven wheels are damaged such that they are rendered inoperable. Maintaining operational drive or driven wheels is of paramount importance, and can come at the expense of the pressure roller bearings which can be sacrificed to maintain the operation of the drive or driven wheels since the costs and effort to repair and/or replace the drive or driven wheels is considerably greater than the costs to replace pressure roller bearings. The damage to the drive or driven wheels occurs at the mating points of the tooth gap of the drive or driven wheel with the pressure roller bearings.

The loading of the conventional cylindrical pressure roller bearing on the drive and driven wheel causes the tooth gaps to wear out and/or break. When this occurs, the entire drive or lifting wheel or at least the damaged tooth gap segment which may be removably bolted onto the drive and driven wheels, must be replaced, or at least repaired, which is a time consuming and expensive task. During this time, the entire sintering process may come to a halt.

Accordingly, there is a need for an improved pressure roller bearing that not only resists wear, but also minimizes damage caused to the tooth gaps of the drive and driven wheel as a consequence of the severe and constant engagement with the pressure roller bearings of the pallet car.

SUMMARY OF THE INVENTION

According to an aspect of the invention there is provided an improved pressure roller bearing for a pallet car.

According to an aspect of the invention there is provided a pressure roller bearing for a pallet car configured to be resistant to damage.

According to an aspect of the invention there is provided a pressure roller bearing for a pallet car configured to minimize damage done to the drive or lifting wheel.

According to an aspect of the invention there is provided a crown barrel-like shape pressure roller configured to maintain the same point of loading with respect to the tooth gaps the drive wheels or driven wheels.

According to an aspect of the invention there is provided a pressure roller bearing for use with a pallet car, the bearing comprising:
  an external annular race having:
    an exterior surface for reversible mating engagement with a tooth gap of a wheel,
    a pair of sidewalls defining ends of the bearing, wherein the radial diameter of the exterior surface at a center portion in the axial direction is greater than the radial diameter of the exterior surface at the ends of the bearing, and
    an interior annular groove;
  an internal annular race defining a hole therethrough for receiving an axle, and having an exterior annular groove; and
  a plurality of rolling cylindrical members located in an interior space defined by the interior annular groove and the exterior annular groove when the internal annular race is received by the external annular race.

According to an aspect of the invention, the exterior surface is crowned such that the radial diameter of the exterior cylindrical surface at the center portion in the axial direction is larger than the radial diameter of the exterior cylindrical surface moving axially away from the center portion and towards each of the ends of the bearing.

According to an aspect of the invention, the external and internal annular races have substantially the same axial length such that the ends of the bearing are flush.

According to an aspect of the invention, there is a single row of rolling cylindrical members.

According to an aspect of the invention, the cylindrical members are relatively small when compared to the thickness of the external annular race as measured from exterior cylindrical surface to interior annular groove of the external annular race.

According to an aspect of the invention, a sealing assembly is provided at each end of the bearing.

According to an aspect of the invention, the sealing assembly is formed from an annular gap in the exterior surface of the internal annular race, and includes a resilient annular seal dimensioned to fit within the annular gap in the exterior surface of the internal annular race.

According to an aspect of the invention, the sealing assembly comprises a labyrinth seal.

According to an aspect of the invention, the labyrinth seal is formed from an annular gap in the interior surface of the external annular race, and an annular gap in the exterior surface of the internal annular race, and an annular seal assembly dimensioned to fit within the annular gaps in the external annular race and internal annular race.

According to an aspect of the invention, the seal assembly comprises at least one lip.

According to an aspect of the invention, the at least one lip is an inward turning lip.

According to an aspect of the invention, the seal assembly comprises a plurality of lips.

According to an aspect of the invention, the seal assembly further comprises a snap ring.

BRIEF DESCRIPTION OF THE DRAWINGS

FIG. 2a is a perspective view of a pelletizing machine with a drive or lifting wheel and plurality of pallet cars arranged in an endless pallet car chain;

FIG. 3 is a perspective view of a pallet car showing two pairs of track assemblies;

FIG. 4b is a cross sectional view of the track assembly of FIG. 4a cut along the line A-A in FIG. 4a;

FIG. 5a is a perspective view of the track roller and the pressure roller bearings of an track assembly;

FIG. 5b is a perspective view of an isolated track assembly showing a partial cut-away view exposing the bearings of a track roller;

FIG. 7b is a perspective view of the pressure roller bearing according of FIG. 7a;

FIG. 8a is a perspective view of the pressure roller bearing as shown in FIG. 7a as part of a track assembly fitted to a pallet car;

FIG. 8b is another perspective view of the pressure roller bearing as shown in FIG. 7a as part of a track assembly fitted to a pallet car;

DETAILED DESCRIPTION

Figure 1:
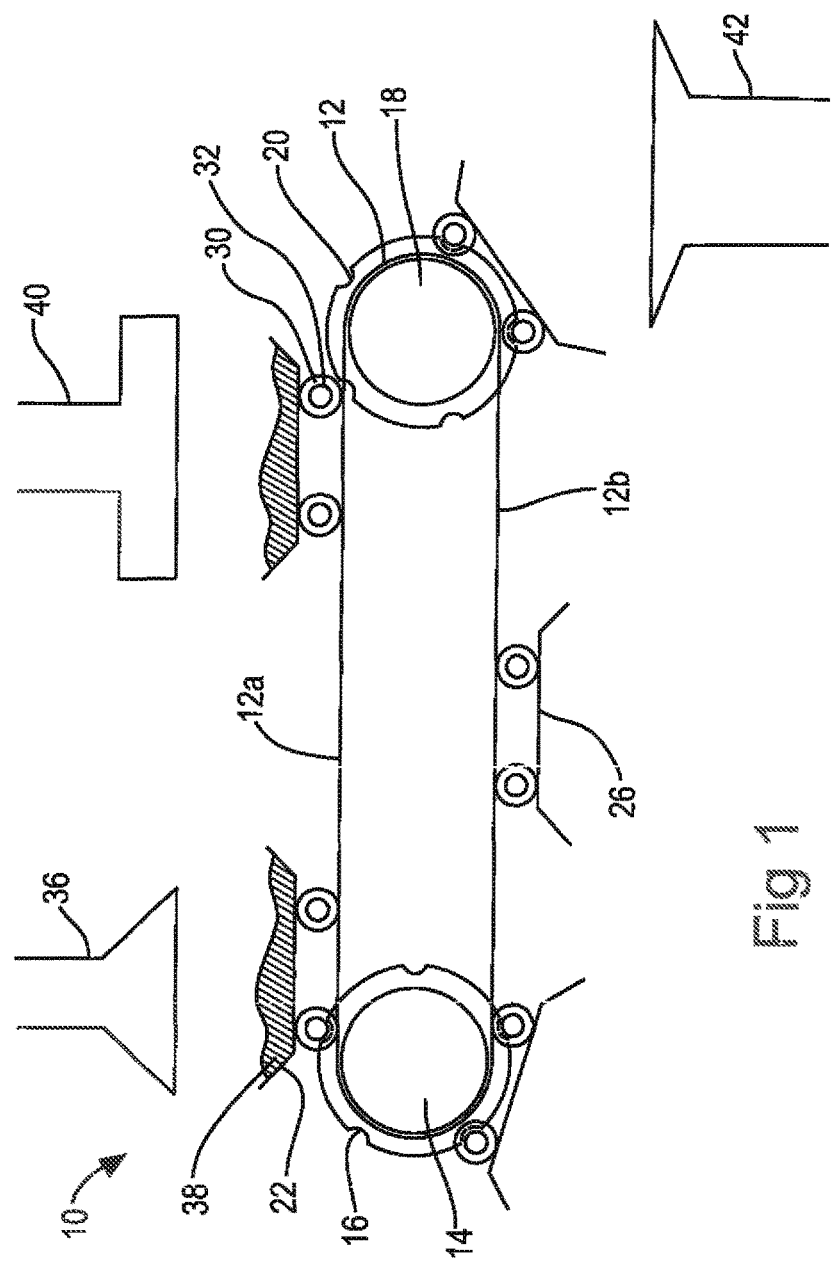
FIG. 1 is an elevation view showing a pelletizing machine with traveling grate in a pelletizing plant.

Reference will be made below in detail to exemplary embodiments of the invention, examples of which are illustrated in the accompanying drawings. Wherever possible, the same reference numerals used throughout the drawings refer to the same or like parts.

An embodiment of the pressure roller bearing configured for use with a pallet car of a pelletizing machine for producing ore pellets is depicted in FIGS. 1 through 6. As shown in FIGS. 1 and 2a, a pelletizing machine 10 comprises a continuous conveyor system including a pair of guide rails 12 having a top strand 12a and a bottom strand 12b. At one end, there is a pair of powered drive or lifting wheels 14 having tooth gaps 16. At the other end of the conveyor system, there is a pair of driven or lowering wheels 18 having similarly dimensioned tooth gaps 20. A plurality of pallet cars 22 are arranged in an endless pallet car chain known as a travelling grate 24.

As shown in FIGS. 1, 2a, and 3, pallet cars 22 have a loading bay 26 for carrying bulk material and a track assembly 28 comprising track rollers 30 for rolling contact with the guide rails 12 and pressure rollers bearings 32. As shown in FIGS. 3, 4a, 4b, 5a, and 5b the track rollers 30 and pressure rollers bearings 32 are configured to receive a rotatable axle 34 therethrough.

Figure 2B:
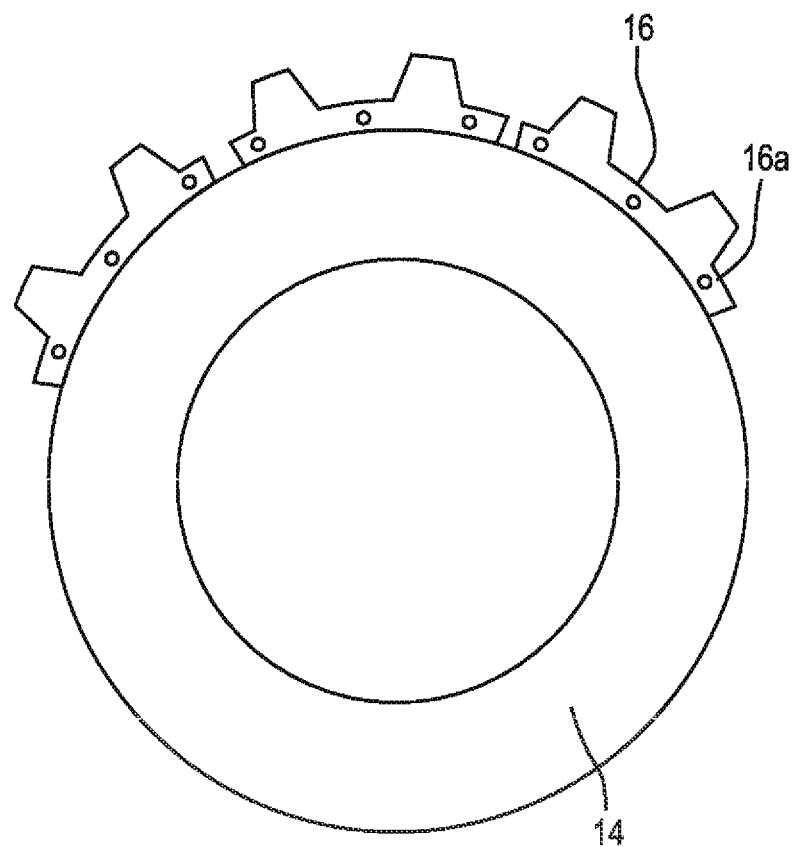
FIG. 2b is a schematic view of a drive wheel showing a plurality of removably attachable tooth gap segments comprising a plurality of tooth gaps on the drive wheel.
Figure 4A:
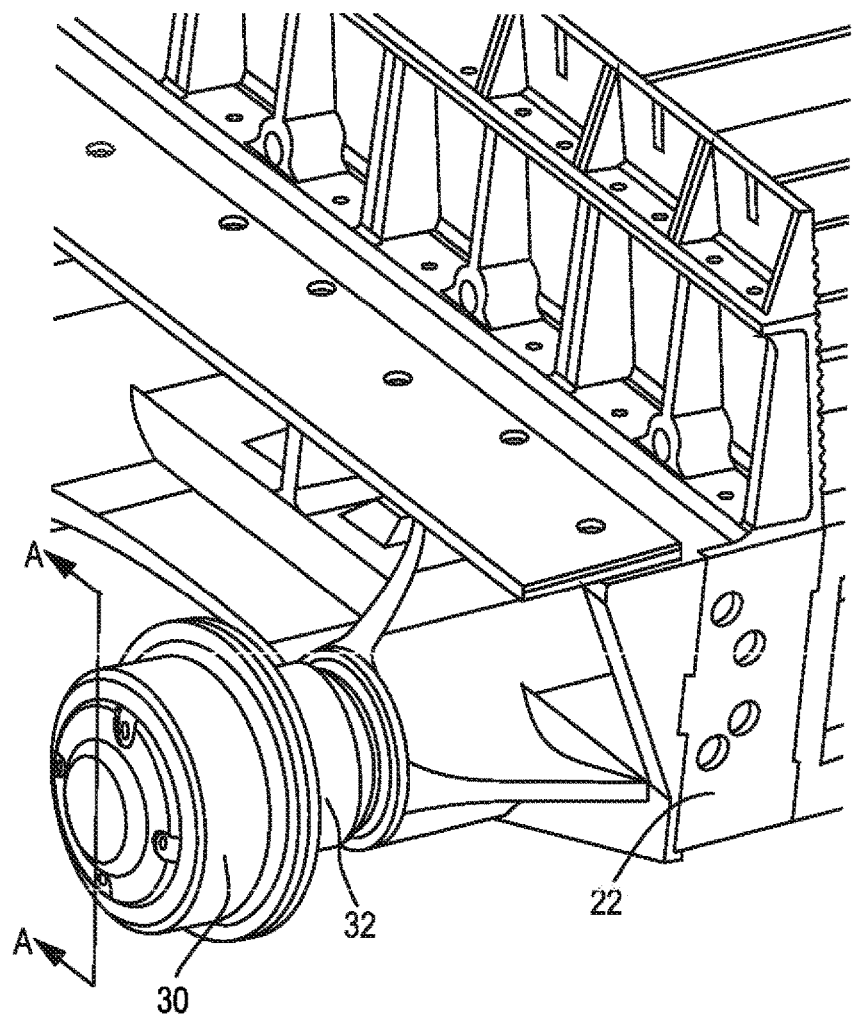
FIG. 4a is a perspective view of one the track assembly of the pallet car.

Pallet cars 22 are moved along in the continuous conveyor system wherein the track rollers 30 of the pallet cars 22 are supported by the top strand 12a of the guide rails 12. The drive of the traveling grate 24 is effected via the drive or lifting wheel 14 where the tooth gaps 16 are configured for reversible mating engagement with the pressure roller bearings 32 of the pallet cars 22. Tooth gaps 16 may be formed out of any conventional drive or lifting wheel 14 of typical construction known to those skilled in the art. As shown in FIG. 2a, tooth gaps 16 and 20 have a generally planar surface for receiving the pressure roller bearing 32. As shown in FIG. 2b, tooth gaps 16 or 20 can also be formed on tooth gap segments 16a (or 20a not shown), where a plurality of segments 16a or 20a can be removably attached (such as by being bolted) to the drive 14 or driven wheels 18, respectively. While only three tooth gap segments 16a are shown in FIG. 2b, it will be appreciated that a sufficient number of tooth gap segments 16a would be attached so as to enclose the entire circumference of the drive wheel 14.

At a bulk material supply station 36, a bulk material 38 is loaded onto the loading bay 26 of the pallet car 22 and the bulk material to be treated is transported on the pallet car 22 to treatment stations 40 where the bulk material 38 is dried, preheated, fired and cooked, for example. The bulk material 38 is then transported by the conveyor to a discharge station 42 which is associated with the driven or lowering wheel 18 of the continuous conveyor.

At the driven wheel 18, the tooth gaps 20 of the driven wheel 18 engage the pressure roller bearings 32 of the pallet car 22. The pallet car 22 is tilted so that the bulk material 38 is dumped by gravity. The now empty pallet car 22 remains inverted until it again encounters the drive or lifting wheel 14, whereby the pressure roller bearings 32 of the pallet car 22 mate with the tooth gaps 16 of the drive wheel 14, and the pallet car 22 is then lifted into its normal upright position for receiving another load of the bulk material 38 to be treated.

Figure 6:
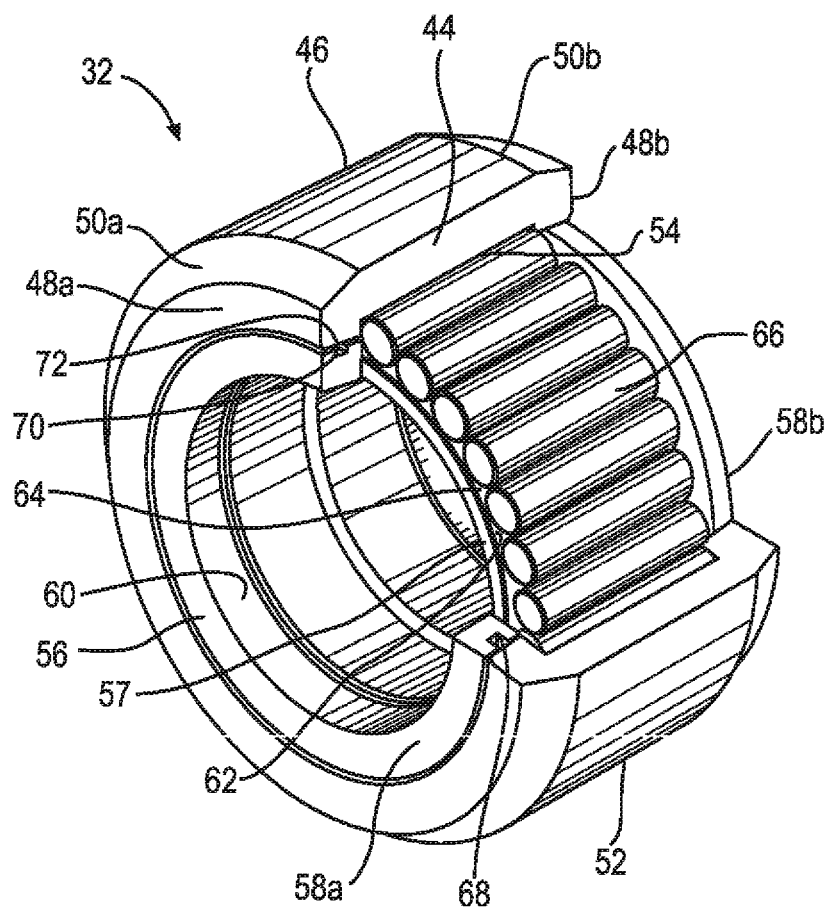
FIG. 6 is a partial cut-away view of an isolated pressure roller bearing.

The pressure roller bearing 32 will now be described in more detail with reference to FIGS. 4a, 4b, 5a, 5b and 6. Shown in FIG. 6 is the pressure roller bearing 32 in isolation and in greater detail. Each pressure roller bearing 32 includes an external annular race 44 having an exterior surface 46 configured for reversible mating engagement with the respective tooth gaps 16, 20 of the drive wheel 14 and the driven wheel 18.

A pair of sidewalls 48a and 48b defines the ends of the external annular race 44 and thus, the ends of the bearing 32. The exterior surface 46 includes beveled surfaces 50a and 50b which join the exterior surface 46 to each sidewall 48a and 48b. The beveled surfaces 50a and 50b provide for a gradual slope joining each sidewall 48a and 48b to the exterior surface 46 of the bearing 32. As will be explained below, the provision of the beveled surfaces 50a and 50b on the exterior surface 46 serves to mitigate damage to the respective tooth gaps 16, 20 on the drive wheels 14 and driven wheels 18.

As shown clearly in FIGS. 5a, 5b, and 6, a portion of the exterior surface 46 is a substantially planar surface 52 and this planar surface 52 is parallel to an axis of rotation of the axle 34 of the pallet car 22.

Having reference to FIGS. 5a, 5b, and 6, it will be appreciated that the bearing 32 generally assumes barrel-like shape in that that the radial diameter of the exterior surface 46 at the center portion in the axial direction is larger than the radial diameter of the exterior surface 46 proximate to the sidewalls 48a and 48b and at the ends of the bearing 32.

As shown in FIG. 6, an annular groove or raceway 54 is formed in the interior of the external annular race 44.

The bearing 32 includes an internal annular race 56 which is concentrically arranged with respect to the external annular race 44. Accordingly, it will be appreciated that the internal annular race 56 is configured to be received by the external annular race 44. The internal annular race 56 comprises an internal annular bushing 57 and a pair of sidewalls 58a and 58b which define the ends of the internal annular race 56.

As shown in FIG. 6, the internal annular race 56 defines a hole 60 therethrough for receiving the axle 34 of the pallet car 22. The internal annular race 56 also includes an exterior annular groove or raceway 62 that is formed when the sidewalls 58a and 58b enclose the internal annular bushing 57. The raceway 62 is configured such that when the external annular race 44 and the internal annular race 56 are brought together in a concentric arrangement, the annular grooves or raceways 54, 62 face each other and define an interior space 64 therebetween.

As shown in FIG. 6, the external annular race 44 and internal annular race 56 have substantially similar axial lengths as measured from the one sidewall to the other sidewall such that in the assembled bearing 32, the ends of the bearing 32 are flush. In an especially preferred embodiment where the ends of the bearing 32 are flush, the bearings 32 are known to be more resistant to breakage due to point loading or other types of stresses.

In a preferred embodiment, the axial length of the bearing 32 is around 90 mm to around 160 mm, the diameter of the hole 60 for the axle 34 is around 80 mm to 150 mm, and the radial diameter of the bearing 32 is from about 150 mm to 400 mm. In a preferred embodiment, the axial length of the bearing 32 is around 15.5 cm. However, it will be appreciated that the axial length of the bearing 32, and the overall dimensions of the bearing 32, will be dictated by the required size and type of pallet car 22.

As shown in FIG. 6, a plurality of rolling cylindrical members 66 are dimensioned to fit inside the interior space 64 formed out of the annular grooves 54, 62 of the external 32 and internal 44 annular races. The cylindrical members 66 are arranged in a single row within the interior space 64. Using only a single row arrangement of the cylindrical members 66 means there is one continuous annular groove 54 and one continuous annular groove or raceway 62. This single row arrangement of cylindrical members 66 is an especially preferred because this arrangement minimizes the number of uneven surfaces inside the bearing 32, which has the effect of reducing breakage of the bearing 32.

The cylindrical members 66 have a relatively small radial diameter and can be any known pin or needle. In a preferred embodiment, the radial diameter of the cylindrical members 66 is relatively small when compared to the thickness of the external annular race 44 as measured from exterior surface 46 to the interior annular groove 54 of the external annular race 44. In this embodiment, by providing cylindrical members 66 that are more compact, the external annular race 44 can be made thicker without increasing the overall dimensions of the bearing 32. It will be appreciated that the bearing 32 of the present invention will have enhanced durability because the thickness of the external annular race 44 is greater compared to the thickness of those external annular races used in current commercially available conventional pressure roller bearings. In another preferred embodiment, the axial length of the cylindrical members 66 is about 9.4 to 9.5 cm, and the radial diameter of the cylindrical members 66 is about 1.78 cm. The thickness of the external annular race 44 as measured from exterior surface 46 to the interior annular groove 54 of the external annular race 44 is about 1.9 cm.

As shown in FIG. 6, a sealing member 68 at each end of the bearing 32 prevents dust, outside grease, and other unwanted debris from entering the interior space 64 and interfering with the movement of the cylindrical members 66. As well, sealing member 68 prevents leakage of any lubrication contained within the interior space 64. In a preferred embodiment, the sealing member 68 is a labyrinth seal which is formed from an annular gap 70 in the exterior surface of the internal annular race 56, and a resilient annular seal 72 dimensioned to fit within the annular gap 70 in the exterior surface of the internal annular race 56. Alternatively, and not shown, the sealing member 68 can comprise an annular gap formed in an interior surface of the external annular race or even combination where each external and internal race includes annular gaps for receiving the sealing member.

According to another embodiment shown in FIGS. 7a, 7b, 7c, 8a, and 8b, a pressure roller bearing 132 includes an external annular race 144 having an exterior surface 146 configured for reversible mating engagement with the respective tooth gaps 16, 20 of the drive wheel 14 and the driven wheel 18.

Figure 7A:
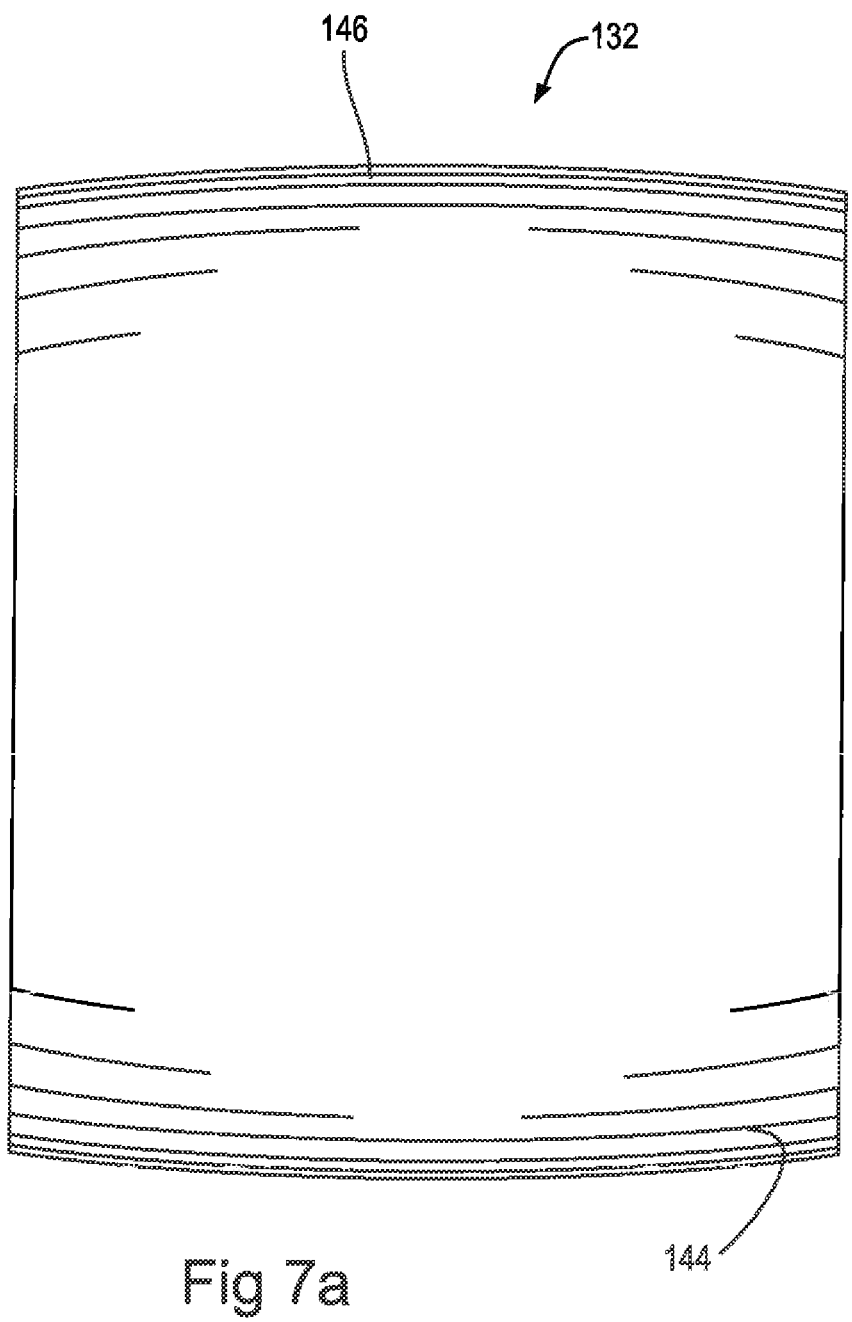
FIG. 7a is a side elevation view of a pressure roller bearing according to another embodiment of the present invention.
Figure 7B:
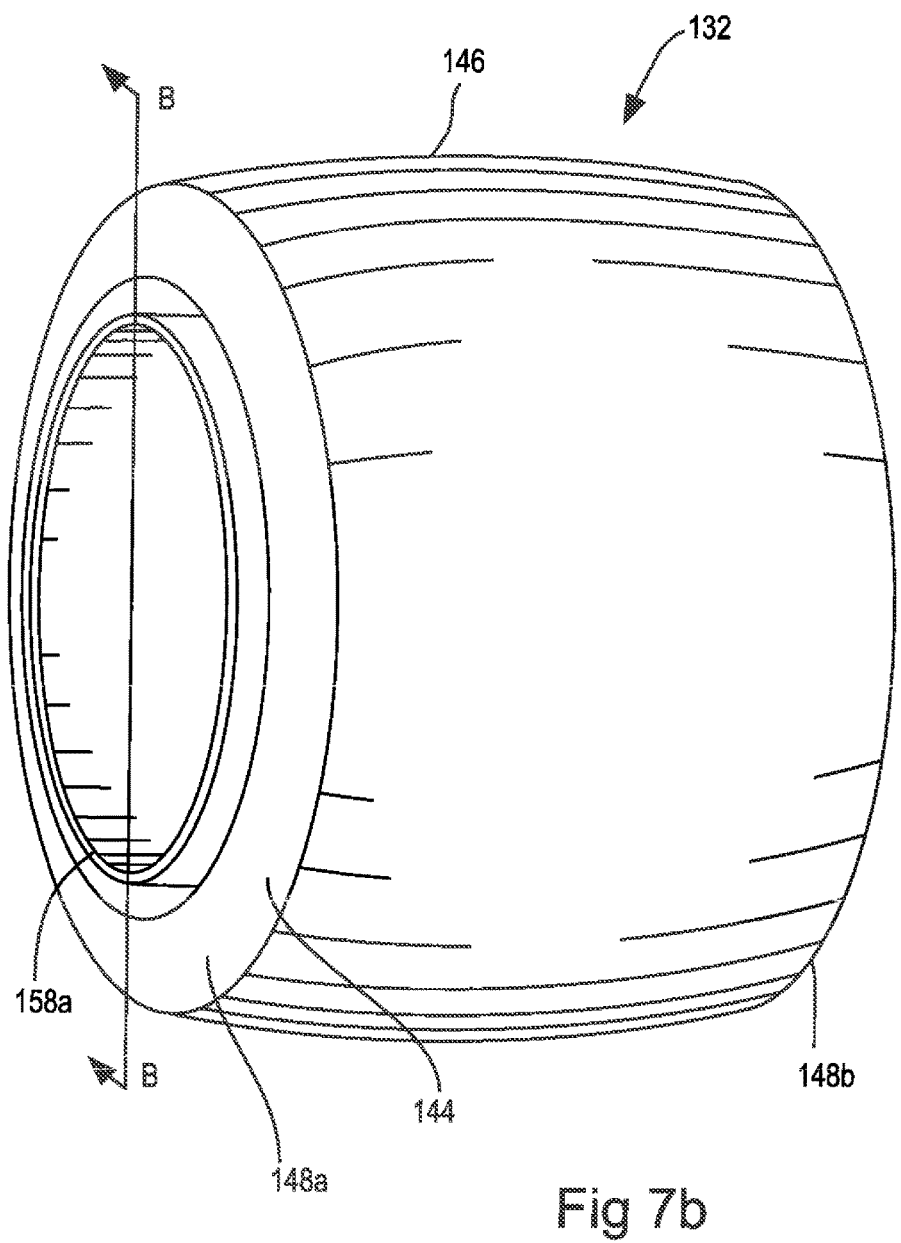
Figure 7C:
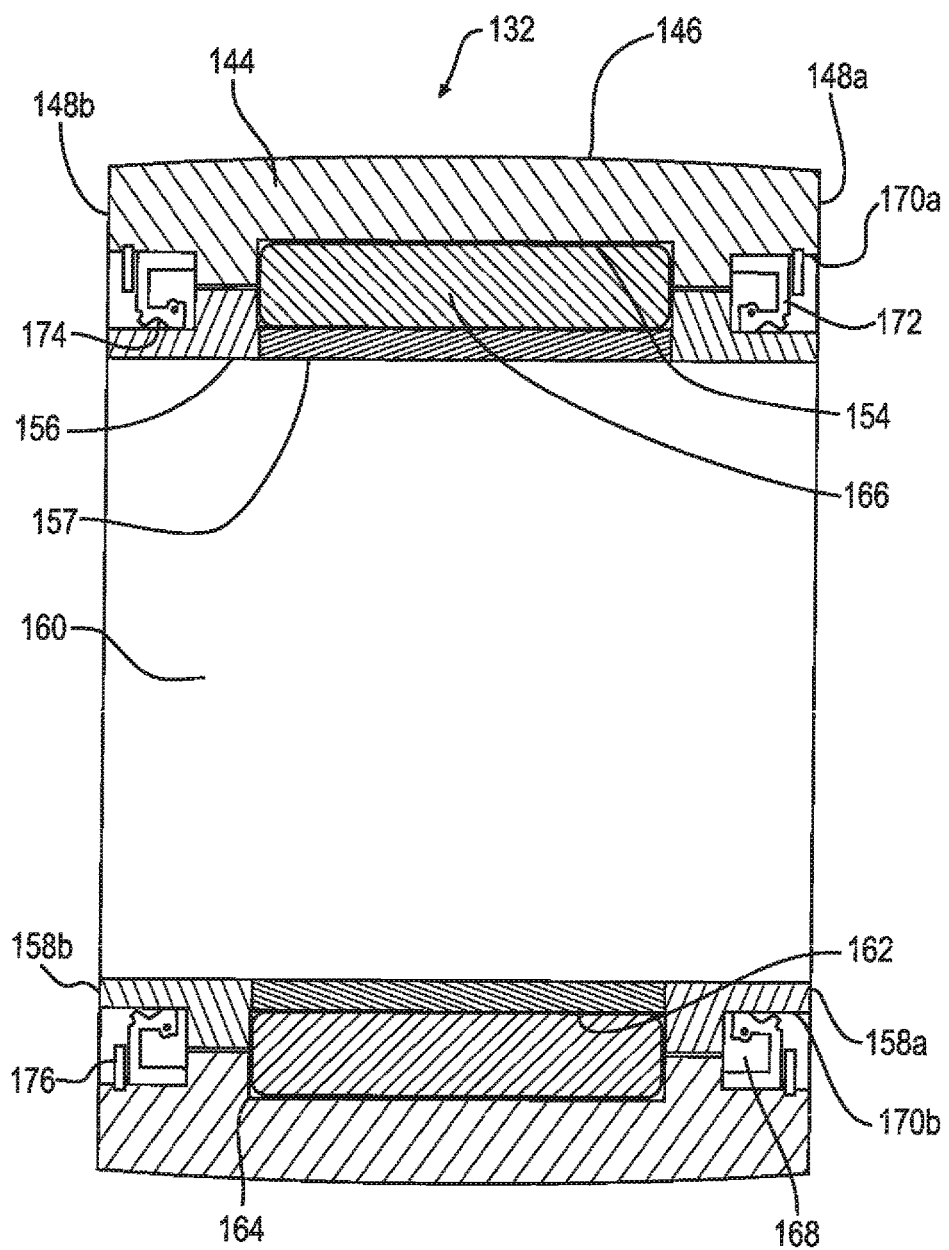
FIG. 7c is a cross sectional view of the pressure roller bearing according to FIG. 7b cut along the line B-B in FIG. 7b.

As shown in FIG. 7c, a pair of sidewalls 148a and 148b defines the ends of the external annular race 144 and thus, the ends of the bearing 132. An annular groove or raceway 154 is formed in the interior of the external annular race 144.

The pressure roller bearing 132 assumes a crowned barrel-like shape configuration where the exterior surface 146 is crowned from one sidewall 148a to another sidewall 148b. In this embodiment, the radial diameter of the exterior surface 146 at the center portion in the axial direction is larger than the radial diameter of the exterior surface 146 moving in an axial direction away from the center portion and towards each end of the bearing 132. It will be appreciated that while the curvature of the crown is relatively subtle, this crowned barrel-like shape configuration of the bearing 132 serves to mitigate the damage to the respective tooth gaps 16, 20 of the drive wheels 14 and the driven wheels 18

As shown in FIG. 7c, the bearing 132 includes an internal annular race 156 which is concentrically arranged with respect to the external annular race 144. Accordingly, it will be appreciated that the internal annular race 156 is configured to be received by the external annular race 144. The internal annular race 156 comprises an internal annular bushing 157 and a pair of sidewalls 158a and 158b that define the ends of the internal annular race 156.

The internal annular race 156 defines a hole 160 therethrough for receiving the axle 34 of the pallet car 22. The internal annular race 156 also includes an exterior annular groove or raceway 162 that is formed when the sidewalls 158a and 158b enclose the internal annular bushing 157. The raceway 162 is configured such that when the external annular race 144 and the internal annular race 156 are brought together in a concentric arrangement, the annular grooves or raceways 154, 162 face each other and define an interior space 164 therebetween.

As shown in FIG. 7c, the external annular race 144 and internal annular race 156 have substantially similar axial lengths as measured from the one sidewall to the other sidewall such that in the assembled bearing 132, the ends of the bearing 132 are flush. In an especially preferred embodiment where the ends of the bearing 132 are flush, the bearing 132 are known to be more resistant to breakage due to point loading or other types of stresses.

In a preferred embodiment, the axial length of the bearing 132 is around 90 mm to around 160 mm, the diameter of the hole 160 for the axle 34 is around 80 mm to 150 mm, and the radial diameter of the bearing 132 is from about 150 mm to 400 mm. In a preferred embodiment, the axial length of the bearing 132 is around 15.5 cm. However, it will be appreciated that the axial length of the bearing 132, and the overall dimensions of the bearing 132, will be dictated by the required size and type of pallet car 22.

As shown in FIG. 7c, a plurality of rolling cylindrical members 166 are dimensioned to fit inside the interior space 164 formed out of the annular grooves 154, 162 of the external 144 and internal 156 annular races. The cylindrical members 166 are arranged in a single row within the interior space 164. Using only a single row arrangement of the cylindrical members 166 means there is one continuous annular groove 154 and one continuous annular groove or raceway 162. This single row arrangement of cylindrical members 166 is especially preferred because this arrangement minimizes the number of uneven surfaces inside the bearing 132, which has the effect of reducing breakage of the bearing 132.

The cylindrical members 166 have a relatively small radial diameter and can be any known pin or needle. In a preferred embodiment, the radial diameter of the cylindrical members 166 is relatively small when compared to the thickness of the external annular race 144 as measured from exterior surface 146 to the interior annular groove 154 of the external annular race 144. In this embodiment, by providing cylindrical members 166 that are more compact, the external annular race 144 can be made thicker without increasing the overall dimensions of the bearing 132. It will be appreciated that the bearing 132 of the present invention will have enhanced durability because the thickness of the external annular race 144 is greater compared to the thickness of those external annular races used in current commercially available conventional pressure roller bearings. In another preferred embodiment, the axial length of the cylindrical members 166 is about 9.4 to 9.5 cm, and the radial diameter of the cylindrical members 166 is about 1.78 cm. The thickness of the external annular race 144 as measured from exterior surface 146 to the interior annular groove 154 of the external annular race 144 is about 1.9 cm As shown in FIG. 7c, pressure roller bearing 132 includes a sealing assembly 168 at each end of the bearing 132 which prevents dust, outside grease, and other unwanted debris from entering the interior space 164 and interfering with the movement of the cylindrical members 166. As well, sealing assembly 168 prevents leakage of any lubrication contained within the interior space 164. In a preferred embodiment, the sealing assembly 168 is a labyrinth seal which is formed from an annular gap 170a in the interior surface of the external annular race 144, an annular gap 170b in the exterior surface of the internal annular race 156, and an annular seal assembly 172 dimensioned to fit within the annular gaps 170a, 170b.

The annular seal assembly 172 comprises a lip 174 (such as a grease retention device) turned inwards to retain lubricant and a snap ring 176 (such as snap ring type 165). While not shown, one skilled in the art will appreciate that the annular seal assembly 172 can include a lip 174 that turns outwards to exclude dirt and debris or a plurality of lips in combination that respectively retain lubricant and exclude dirt.

As discussed above, the damage to the drive wheel 14 or lifting wheel 18 occurs at the mating points of the tooth gap 16, 20 of the drive 14 or driven wheel 18 with the pressure roller bearings 32, 132. The inventors have discovered that damage occurs as a result of the manner in which conventional pressure roller bearings engage the tooth gaps 16, 20 of the drive wheel 14 and the driven wheel 18.

Figure 9A:
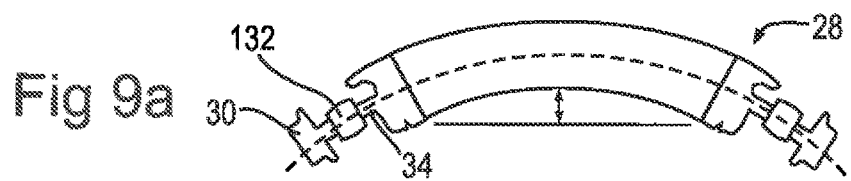
FIG. 9a is a schematic view of the track assembly where the track roller and pressure roller bearing assume a positive camber arrangement.
Figure 9B:
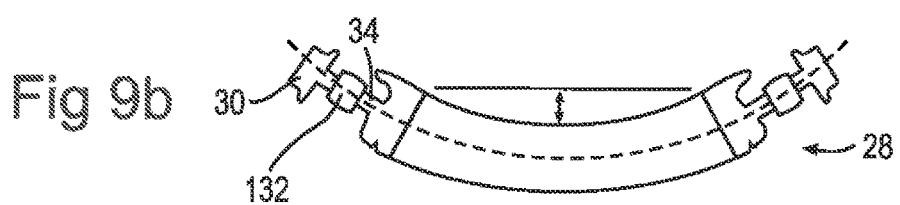
FIG. 9b is a schematic view of the track assembly where the track roller and pressure roller bearing assume a negative camber arrangement.

As shown in FIGS. 9a and 9b, the track rollers 30 and the bearing 132 of the track assembly 28 may assume a slight positive (FIG. 9a) or negative (FIG. 9b) camber angle, depending on the situation.

Figure 9C:
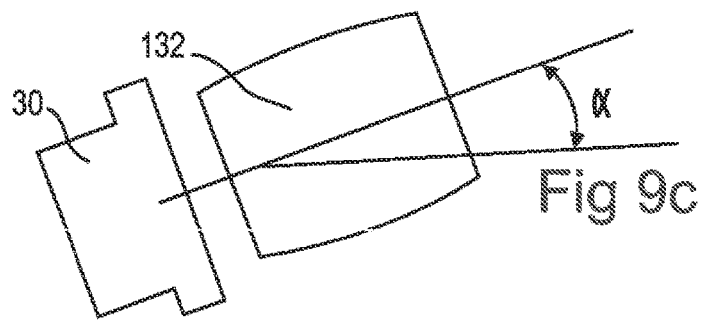
FIG. 9c is a schematic view of the track roller and pressure roller bearing illustrating the range of camber angles assumed by the pressure roller bearing.

As shown in FIG. 9c, the camber angle α may range from about ±1.5 degrees from the axial center of the axle 34 of the track assembly 28. The camber angle will vary depending on a number of factors including the design of the track assembly 28, the weight of load carried by the pallet car 22, and the overall design of the pallet car 22.

Figure 10B:
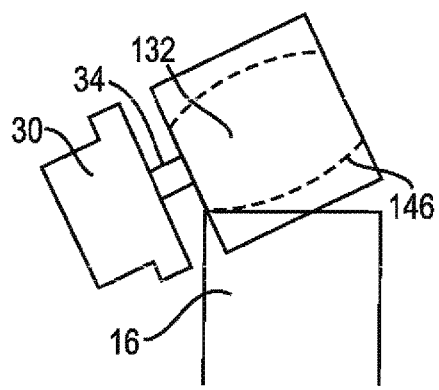
FIG. 10b is a schematic view of the track roller and pressure roller bearing engaging a tooth gap of a driven wheel.
Figure 10A:
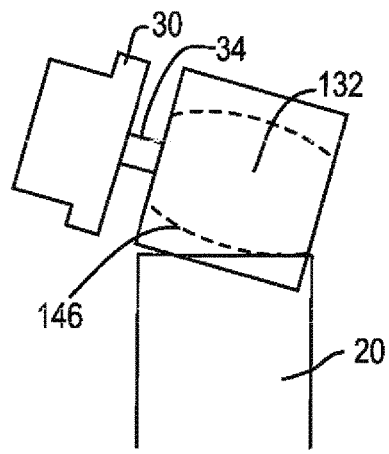
FIG. 10a is a schematic view of the track roller and pressure roller bearing engaging a tooth gap of a drive wheel.

As shown FIG. 10a, when the pallet car 22 is in the upright position, the rollers 28 and the bearing 132 will tend to have a slightly negative camber in relation to the tooth gap 20 of the driven or lowering wheel 18. As the bearing 132 approaches the driven wheel 18, the bearing 132 contacts the tooth gap 20 across only a portion of its entire exterior surface 146. It will be appreciated that the size of the portion of the exterior surface 146 that engages the tooth gap 20 will depend on the degree of camber. In the embodiment shown, it is the region of the exterior surface 146 proximal to loading bay 26 and the center of the pallet car 22 is what primarily engages the tooth gap 20.

As shown in FIG. 10b, when the pallet car 22 is in the inverted position, the rollers 28 and the bearing 132 will tend to have a slightly positive camber in relation to the tooth gap 16 of the drive wheel 14. As the bearing 132 approaches the drive wheel 14, the bearing 132 contacts the tooth gap 16 across only a portion of its exterior surface 146. In the embodiment shown, it is the region of its exterior surface 146 adjacent to the track roller 30 that primarily engages the tooth gap 16.

In assuming barrel-like shape or a crown barrel-like shape, the bearings 32 or 132 are configured to maintain the same point of loading or the same angle of the surface of the bearings 32, 132 with respect to the tooth gaps 15, 20 of the drive wheels 14 or driven wheels 18. In this manner, the force of the impact of the bearings 32 or 132 on the tooth gaps 16, 20 is decreased which will minimize the damage to the tooth gaps 16, 20 of the drive wheel 14 and driven wheel 18 and increases the time between repair and replacement of the drive wheel 14 and driven wheel 18.

This is in contrast to conventional cylindrical pressure roller bearings where the entire exterior surface is planar and the bearing is not barrel-like or crown barrel-like shaped as in the described embodiments. When these conventional pressure roller bearings are used, there is an angle between the exterior surface of the pressure roller bearing and the planar surface of the tooth gaps 16, 20. Accordingly, the tooth gaps 16, 20 of the drive 14 and driven wheel 18 experience significant mechanical stress and are prone to damage at the points of contact with the conventional pressure roller bearings.

The embodiments of the present application described above are intended to be examples only. Those of skill in the art may effect alterations, modifications and variations to the particular embodiments without departing from the intended scope of the present application. In particular, features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole. Any dimensions provided in the drawings are provided for illustrative purposes only and are not intended to be limiting on the scope of the invention. The subject matter described herein and in the recited claims intends to cover and embrace all suitable changes in technology.

The invention claimed is:

1. A pressure roller bearing for use with a pallet car, the bearing comprising:
   an external annular race having:
      an exterior surface for reversible mating engagement with a tooth gap of a wheel,
      a pair of sidewalls defining ends of the bearing, wherein the radial diameter of the exterior surface at a center portion in the axial direction is greater than the radial diameter of the exterior surface at the ends of the bearing, and
      an interior annular groove;
   an internal annular race defining a hole therethrough for receiving an axle, and having an exterior annular groove;
   a plurality of rolling cylindrical members located in an interior space defined by the interior annular groove and the exterior annular groove when the internal annular race is received by the external annular race; and
   a sealing assembly provided at each end of the bearing, wherein the sealing assembly is formed from an annular gap in the exterior surface of the internal annular race and a resilient annular seal dimensioned to fit within the annular gap in the exterior surface of the internal annular race.

2. The bearing of claim 1 wherein the exterior surface is crowned such that the radial diameter of the exterior surface at the center portion in the axial direction is larger than the radial diameter of the exterior surface moving axially away from the center portion and towards each of the ends of the bearing.

3. The bearing of claim 1 wherein the external and internal annular races have substantially the same axial length such that the ends of the bearing are flush.

4. The bearing of claim 1 wherein there is a single row of the rolling cylindrical members.

5. The bearing of claim 1 wherein the cylindrical members are relatively small when compared to the thickness of the external annular race as measured from exterior cylindrical surface to interior annular groove of the external annular race.

6. A kit for a pressure roller bearing for use with a pallet care, the kit comprising the bearing of claim 1 and instructions for assembling the bearing.

7. A pressure roller bearing for use with a pallet car, the bearing comprising:
   an external annular race having:
      an exterior surface for reversible mating engagement with a tooth gap of a wheel,
      a pair of sidewalls defining ends of the bearing, wherein the radial diameter of the exterior surface at a center portion in the axial direction is greater than the radial diameter of the exterior surface at the ends of the bearing, and
      an interior annular groove;
   an internal annular race defining a hole therethrough for receiving an axle, and having an exterior annular groove;
   a plurality of rolling cylindrical members located in an interior space defined by the interior annular groove and the exterior annular groove when the internal annular race is received by the external annular race; and
   a sealing assembly provided at each end of the bearing, wherein the sealing assembly comprises a labyrinth seal, wherein the labyrinth seal is formed from an annular gap in the interior surface of the external annular race, and an annular gap in the exterior surface of the internal annular race, and an annular seal assembly dimensioned to fit within the annular gaps in the external annular race and internal annular race.

8. The bearing of claim 7 wherein the annular seal assembly comprises at least one lip.

9. The bearing of claim 8 wherein the at least one lip is an inward turning lip.

10. The bearing of claim 8 wherein the annular seal assembly comprises a plurality of lips.

11. The bearing of claim 8 wherein the annular seal assembly further comprises a snap ring.

12. The bearing of claim 7 wherein the exterior surface is crowned such that the radial diameter of the exterior surface at the center portion in the axial direction is larger than the radial diameter of the exterior surface moving axially away from the center portion and towards each of the ends of the bearing.

13. The bearing of claim 7 wherein the external and internal annular races have substantially the same axial length such that the ends of the bearing are flush.

14. The bearing of claim 7 wherein there is a single row of the rolling cylindrical members.

15. The bearing of claim 7 wherein the cylindrical members are relatively small when compared to the thickness of the external annular race as measured from exterior cylindrical surface to interior annular groove of the external annular race.

16. A kit for a pressure roller bearing for use with a pallet car, the kit comprising the bearing of claim 7 instructions for assembling the bearing.

\* \* \* \* \*